June 20, 1950  T. A. HERRON  2,512,018
MOUNTING DEVICE FOR TRUSS PADS
Filed June 4, 1949
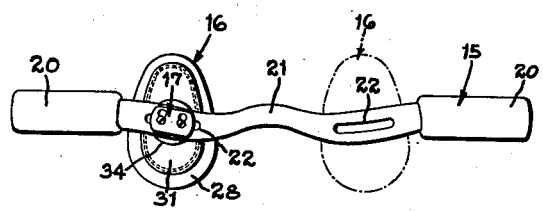
Fig. 1
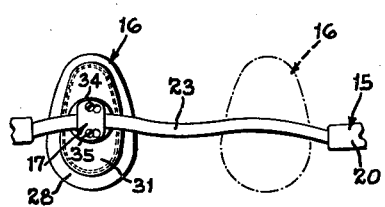
Fig. 2
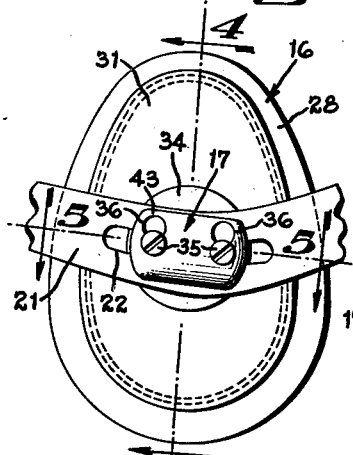
Fig. 3
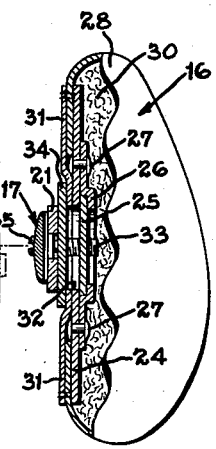
Fig. 4
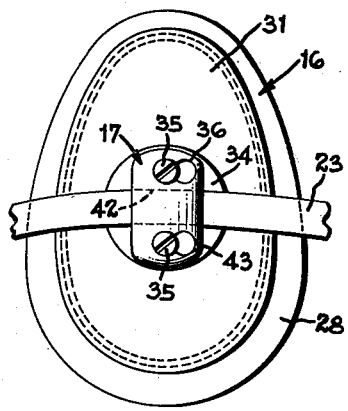
Fig. 6
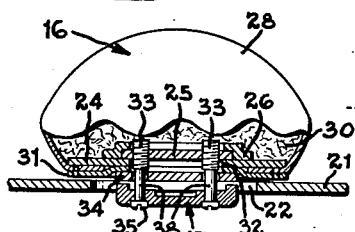
Fig. 5
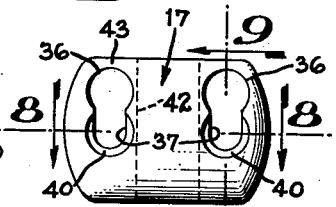
Fig. 7
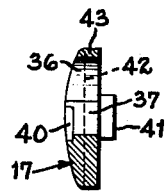
Fig. 9
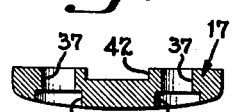
Fig. 11
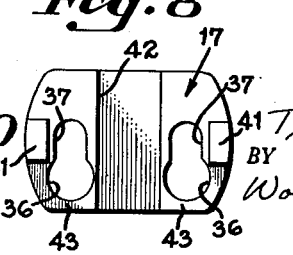
Fig. 8
Fig. 10
INVENTOR.
Truman A. Herron
BY
Wood, Arey, Herron & Evans
ATTORNEYS Patented June 20, 1950

2,512,018

UNITED STATES PATENT OFFICE 2,512,018

MOUNTING DEVICE FOR TRUSS PADS

Truman A. Herron, Indian Hill, Ohio, assignor to Surgical Appliance Industries, Inc., Cincinnati, Ohio Application June 4, 1949, Serial No. 97,147

1 Claim. (Cl. 128—124)

This invention relates to trusses of the type used extensively in the treatment of hernia and similar disorders, consisting of a flexible band or frame adapted to encircle the body and having one or more soft pads which are pressed by the frame against the injury or protuberance. The present improvements relate particularly to an improved locking plate or hasp by which the pad may be mounted interchangeably upon different styles of frames conveniently and securely, with provisions for adjusting the position of the pad with respect to the frame.

Flexible truss frames in general constitute a metal band or loop including flexible limbs which are enclosed by a soft covering to prevent chafing, with an exposed pad mounting bar at one or more places for attachment of the pad. The frames are furnished commercially in two standard styles, one of which provides relatively wide pad mounting bars, slotted to receive the pad attaching screws while the other style provides narrower unslotted mounting bars, in this case the pad being mounted with its screws straddling the narrow bar section. In view of the various conditions encountered, it is necessary for the supplier to carry in stock a wide variety of pads which may be installed upon the standard frames to suit the needs of the individual. For this reason, it is important to provide a mounting structure which enables the supplier to mount quickly and conveniently the required pad or pads upon a selected frame of either style.

The commercial truss pad includes an internal clamping plate having a pair of spaced screws threaded into the plate and extending outwardly, the plate being rotatably mounted to permit angular adjustments of the pad. The pad is mounted upon the bar by placing the pad to the inside of the bar with the screws extending outwardly, placing a locking plate or hasp against the outside of the bar to engage the heads of the screws, then tightening the screws to clamp the pad in place.

One form of interchangeable hasp is disclosed in the patent of Arthur R. Bell, No. 2,108,521 which constitutes a hasp having open slots to receive the mounting screws of the pad and arranged to permit the pad to be mounted upon either type of truss frame.

The primary objects of the present inventor have been to provide an interchangeable hasp structure which is simpler yet stronger, which provides a more reliable and secure attachment of the pad to the frame and which is devoid of slots and sharp corners which tend to catch and damage the wearer's clothing.

The improved structure constitutes a rectangular body having a pair of keyhole apertures at opposite ends to permit the hasp to be slipped directly over and engaged with the heads of the screws, the underside of the body including keys at opposite ends engageable with the slot of a mounting bar to lock the hasp parallel to the bar, the underside also being provided with a transverse groove between the apertures, engageable with an unslotted bar to lock the hasp at right angles to the bar.

By eliminating the open slots formerly utilized, the body periphery is made smooth and uninterrupted so as not to interfere with the clothing and at the same time to increase strength since the open slots weaken the body transversely. By placing the keys at the ends of the hasp body instead of intermediate the apertures, the effectiveness of the keys is increased since the stability of the hasp increases with the spacing of the keys. Also, by the combination of the keyhole slots and keys, the overall length of the unit is decreased since the keys occupy the area alongside the narrow portion of the keyhole apertures. Otherwise stated, the length of the body is determined by the spacing between the apertures, and by taking advantage of the slot contour, no increase in length is required to accommodate the keys.

When the hasp is applied to the slotted mounting bar, it is locked against angular movement by the keys and when applied to an unslotted bar it is locked against angular movement by engagement of the bar with the transverse groove. The narrow ends of the keyhole apertures are provided with countersinks into which the screw heads nest to lock screws and pad to the hasp in a positive manner in either installation. By reason of the locking action of the countersinks, the keys may be omitted entirely in an interchangeable hasp of cheaper construction although the locking effect, when applied to a slotted bar, is not as rigid as that provided by the keys.

Further features and advantages of the improved hasp will be more fully apparent from the following detailed description with reference to the drawings.

In the drawings:

Figure 1 is a front elevation of a truss showing the improved hasp in its application to a slotted bar for mounting the pad.

Figure 2 is a fragmentary view similar to

Figure 1, illustrating the hasp in its application to a frame having an unslotted mounting bar.

Figure 3 is an enlarged fragmentary view taken from Figure 1, further illustrating the application of the hasp to the slotted mounting bar.

Figure 4 is a sectional view taken on line 4—4, Figure 3, detailing the hasp and a portion of the pad.

Figure 5 is a sectional view taken on line 5—5, Figure 3, further detailing the application of the hasp to the slotted mounting bar.

Figure 6 is an enlarged view similar to Figure 3, showing the hasp in its application to the unslotted mounting bar.

Figure 7 is an enlarged top plan view of the hasp removed from the truss.

Figure 8 is a longitudinal sectional view of the hasp taken on line 8—8, Figure 7.

Figure 9 is a cross sectional view of the hasp taken on line 9—9, Figure 7.

Figure 10 is a bottom plan view further detailing the construction of the hasp.

Figure 11 is a sectional view similar to Figure 8, showing a hasp of the same character with the keys omitted.

Described with reference to Figure 1, the truss frame is indicated generally at 15, the pad at 16, and the improved clamping plate or hasp at 17. The structural details of the frame, with the exception of the mounting bar, are omitted since the present invention is confined to the construction of the hasp and its cooperating relationship with the frame and pad. The frame consists of a flexible metal loop or band structure shaped to encircle the body of the wearer under spring tension, including for this purpose, flexible limbs of flat spring stock arranged to be sprung apart to permit the unit to be slipped on conveniently. The limbs usually are covered with soft leather or fabric sheaths 20 for comfort. Intermediate the flexible limbs there is provided a pad mounting bar 21 which may be an exposed section of the limbs but which preferably is a fairly rigid bar having its opposite ends joined to the flexible limbs by rivets or screws.

In the frame structure illustrated in Figure 1, the mounting bar 21 is provided with elongated slots 22—22 for adjustably mounting one or two pads 16, while in the form shown in Figure 2, the mounting bar 23 is narrower than bar 21 and is devoid of slots. The pad can be mounted at any point along the unslotted bar, while as applied to the slotted bar 21, the pads are confined to the area delineated by the slots 22—22. By virtue of the hasp 17, the same pad is adapted to be mounted interchangeably either upon the slotted bar 21 or the bar 23 simply by shifting the hasp at right angles. As applied to the slotted bar 21, the hasp lies parallel with the bar, while in the case of the unslotted bar 23, the hasp overlies the bar at right angles.

Described in detail with reference to the structure disclosed in Figures 1 to 5, the pad 16 is provided with an internal mounting plate 24, formed from sheet metal which plate includes a clamping disk 25 rotatably mounted against the inner surface of plate 24 by a retainer 26, the retainer 26 being secured to plate 24 by rivets 27. Pad 16, in general, constitutes a cover 28, of leather or other soft material, enveloping suitable padding, such as foam rubber, indicated at 30. The marginal edge of the cover 28 overlies the mounting plate 24, and a back cover 31, formed preferably from stiff leather, is stitched to the cover 28 to enclose plate 24. The cover 31 and plate 24 include matching apertures 32 for passage of the mounting screws 33—33, the inner ends of which are in screwthreaded engagement in the internal clamping disk 25.

To the outside of the back cover 31 there is applied an external clamping disk 34, adapted to lie between cover 31 and the mounting bar 21 or 23 when the pad is placed in position against the inside of a mounting bar. In this position, the screws 33 extend outwardly and the hasp 17 is applied to the opposite side of the bar with the screws 33 passing through the hasp, the screw heads 35 being seated against the hasp. When the screws are tightened, the internal clamping disk 25 is drawn into clamping engagement with the external clamping disk 34 which is backed up by the bar and hasp so that the assembly is rigidly joined together. By virtue of the rotatable mounting of the internal rotatable disk 25, the pad 16 can be angularly adjusted upon its axis and can be shifted longitudinally relative to the slot 22 and clamped in adjusted position by tightening the screws 33.

In detail, hasp 17 consists of a rectangular body, fabricated from brass or steel and provided with a pair of keyhole apertures, each constituting a circular opening 36 of sufficient size to pass over the head 35 of screw 33, with a slot 37 connected with but narrower than the circular opening 36, adapted to receive the shank 38 of the screw so that the hasp may be slipped upon the screws then shifted laterally to engage the heads. Each keyhole aperture includes also a countersink or recess 40 formed in the outer face of the hasp, concentric with the end of slot 37, to seat the screw heads (Figures 3 and 5) when the hasp is in clamping position. In order to lock the hasp against rotation there is provided at opposite ends of the hasp, on its inner face, respective keys 41—41 (see Figure 10), adapted to nest in slot 22 as shown in Figure 5, the keys being substantially the same width as the slot, but slightly shorter than the thickness of the bar to prevent bottoming against the external clamping disk 34.

The pad 16 is applied to the slotted mounting bar 21 very simply by placing the pad against the inside surface of the bar with the screws 33 in place. The slot 22 is sufficiently wide to permit the heads 35 of the screws to be slipped through the slot. With the screws projecting through the slot, the hasp 17 is applied to the outer surface of the bar by slipping it over the screws, the heads 35 passing through the large openings 36—36. The hasp then is shifted laterally, engaging the ends of slots 37—37 against the shank 38 of the screws. This aligns the keys 41—41 with slot 22 so that the hasp is guided into keyed engagement with the slot when it is placed against the surface of the mounting bar. Before the screws are tightened finally, the pad is adjusted to its proper longitudinal and angular position, then the screws are tightened to clamp the entire unit rigidly upon the bar 21 with the screw heads nested in the countersinks 40.

In the modified hasp structure shown in Figure 11, the keys 41 are omitted and the countersinks 40a may be made slightly deeper as shown to increase the locking effect with respect to the screw heads. In the preferred form, the keys 41 lock the hasp securely by engagement with the slots of the mounting bar so that the hasp locks the screws, while in the modified form the screws themselves provide a lock to prevent lateral displacement of the hasp. In the modified structure, the hasp is simpler and less costly of construction, while in the preferred structure the attachment is more positive and secure, therefore, the modified structure is utilized in cases where it is necessary to reduce costs.

When the pad is applied to a truss frame having an unslotted mounting bar, the pad is positioned against the bar with the screws 33 straddling the opposite sides of the bar. The hasp is applied by slipping it over the heads of the screws in the manner above noted, then shifting it to engage the shank 38 of the screws in the slots 37 with the heads seated in the countersinks 40. When the screws are drawn up the screw heads will lock the hasp positively against displacement by engagement in the countersinks and the hasp is locked against angular movement at right angles to bar 21 by engagement of the bar in the transverse groove 42 formed in the hasp between the apertures 36—36 (Figures 8 and 10). This arrangement permits the truss pad 16 to be adjusted to desired position longitudinally of the mounting bar and to be rotated angularly to a desired condition before tightening the screws. The hasp unit therefore may be used interchangeably with either type of mounting bar and provides a very rapid and convenient means for mounting the pads.

By virtue of the simplicity of design, the hasp can be manufactured cheaply either by machining or by forging or die casting. By virtue of the keyhole apertures located within the confines of the hasp body, in combination with the locking keys located advantageously within the confines of the keyhole slots, the hasp is made more compact and has the additional advantage of increased strength since the apertures make it unnecessary to cut slots into the hasp. In other words, the apertures provide a connecting web 43 at the margin of the hasp which greatly strengthens the unit and at the same time eliminates sharp corners upon which the clothing may catch. When the screws 33 are finally tightened with their heads 35 nested in the countersinks 40 and the keys 41 locked in the slot 22, the hasp itself is locked positively against angular displacement and the hasp in turn locks the screws positively against lateral shifting and loosening, thus providing a more positive rigid attachment of the pad.

When the hasp is placed upon the narrow mounting bar, the transverse groove 42 of course locks the hasp against angular movement and the screws and pad are positively locked against shifting with respect to the hasp by virtue of the nested engagement of the screw heads in the countersinks. Thus, there is no possibility of the pad shifting except by loosening the screws to disengage their heads. Both hasp forms operate the same as applied to the unslotted bar, the countersinks 40 or 40a establishing a positive lock between the screws and hasp. Both forms of the hasp provide maximum compactness and can be applied with equal speed.

Having described my invention, I claim:

A device for mounting a truss pad interchangeably upon a slotted or unslotted mounting bar, the pad including a pair of headed mounting screws each having a reduced shank portion, the device comprising: a hasp having a pair of keyhole apertures each constituting an enlarged opening for passing the hasp over the heads of the mounting screws and each keyhole aperture including an elongated slot of reduced width connected with the enlarged opening to receive the shank of the associated screw, the end of each said slot having a recess which is formed in the outer surface of the hasp to receive the head of the screw in nested engagement therewith when the hasp is shifted laterally, the under surface of the hasp being provided with keys at opposite ends thereof adapted to fit into the slot of a mounting bar to lock the hasp against angular movement with respect to the bar, each of said keys being located between an end of the hasp and the slot of one of said keyhole apertures, the under surface of the hasp including a transverse groove adapted to nest with an unslotted mounting bar to lock the hasp against angular movement with respect to the bar, the hasp being locked against shifting relative to the screws by the nested engagement of the screw heads with said recesses.

TRUMAN A. HERRON.

REFERENCES CITED

The following references are of record in the file of this patent:

UNITED STATES PATENTS

| Number | Name | Date |
|---|---|---|
| 456,823 | House | July 28, 1891 |
| 1,051,325 | Haile | Jan. 21, 1913 |
| 2,108,521 | Bell | Feb. 15, 1938 |

FOREIGN PATENTS

| Number | Country | Date |
|---|---|---|
| 859,183 | France | May 27, 1940 |